United States Patent
Snyder, II (10) Patent No.: US 10,798,108 B2
(45) Date of Patent: Oct. 6, 2020

(54) APPARATUS AND METHOD FOR A MULTI-ENTITY SECURE SOFTWARE TRANSFER

(71) Applicant: Cavium, LLC, Santa Clara, CA (US)

(72) Inventor: Wilson Parkhurst Snyder, II, Holliston, MA (US)

(73) Assignee: Marvell Asia Pte, Ltd., Singapore (SG)

(*) Notice: Subject to any disclaimer, the term of this patent is extended or adjusted under 35 U.S.C. 154(b) by 0 days.

(21) Appl. No.: 14/542,383

(22) Filed: Nov. 14, 2014

(65) Prior Publication Data

US 2016/0142386 A1 May 19, 2016

(51) Int. Cl.
| | |
|---|---|
| *H04L 29/06* | (2006.01) |
| *H04L 29/08* | (2006.01) |
| *G06F 21/60* | (2013.01) |
| *G06F 21/62* | (2013.01) |

(52) U.S. Cl.
CPC .......... *H04L 63/126* (2013.01); *G06F 21/606* (2013.01); *G06F 21/6218* (2013.01); *H04L 63/0428* (2013.01); *H04L 63/061* (2013.01); *H04L 63/08* (2013.01); *H04L 63/0876* (2013.01); *H04L 63/0884* (2013.01); *H04L 67/141* (2013.01); *H04L 67/34* (2013.01)

(58) Field of Classification Search
CPC ........ G06F 21/606; G06F 21/60; G06F 21/62; G06F 21/6218; H04L 63/04; H04L 63/0428; H04L 63/08; H04L 63/0876; H04L 63/0884
See application file for complete search history.

(56) References Cited

U.S. PATENT DOCUMENTS

| | | | | |
|---|---|---|---|---|
| 6,594,723 B1* | 7/2003 | Chapman | ................. | G06F 8/65 711/103 |
| 6,647,110 B2* | 11/2003 | Lallukka | ................ | H04Q 11/04 379/219 |
| 7,069,578 B1* | 6/2006 | Prus | ......................... | G06F 8/64 348/E5.006 |
| 7,313,679 B2* | 12/2007 | Ranganathan | .......... | G06F 21/57 326/8 |
| 7,502,333 B2* | 3/2009 | Modi | ................. | H04L 41/0803 370/255 |
| 7,512,815 B1* | 3/2009 | Munetoh | ............... | G06F 21/602 380/28 |
| 7,761,164 B2* | 7/2010 | Verhoef | ............. | A61N 1/37282 607/30 |
| 8,006,103 B2* | 8/2011 | Herrell | ............. | G06F 15/17356 713/192 |

(Continued)

*Primary Examiner* — Zachary A. Davis
(74) *Attorney, Agent, or Firm* — pkalousek.ip (57) ABSTRACT

A method and a system embodying the method for a multi-entity secure software transfer are disclosed, the method operating by: configuring a communication interface controller at each trusted hardware entity of a first hardware entity and a second hardware entity to disallow all external access except a communication link configuration access; establishing the communication link between the first hardware entity and the second hardware entity; configuring write access from the second hardware entity to only a first storage at the first hardware entity; and writing the secure software received from the second hardware entity via the communication link to the first storage at the first hardware entity.

21 Claims, 4 Drawing Sheets

(56) References Cited

U.S. PATENT DOCUMENTS

| | | | | |
|---|---|---|---|---|
| 8,272,029 B2* | 9/2012 | Ou | ............... | H04L 63/0227 |
| | | | | 726/1 |
| 8,332,653 B2* | 12/2012 | Buer | ............... | G06F 21/53 |
| | | | | 380/277 |
| 8,522,018 B2* | 8/2013 | Molina | ............... | H04L 63/08 |
| | | | | 709/203 |
| 8,677,467 B2* | 3/2014 | Lincoln | ............... | G06F 21/12 |
| | | | | 726/5 |
| 8,738,932 B2* | 5/2014 | Lee | ............... | G06F 21/72 |
| | | | | 713/164 |
| 8,769,143 B2* | 7/2014 | Meredith | ............... | H04L 63/0263 |
| | | | | 370/465 |
| 8,909,746 B2* | 12/2014 | Currid | ............... | G06F 9/4416 |
| | | | | 709/222 |
| 8,953,806 B2* | 2/2015 | Scarlata | ............... | G06F 21/57 |
| | | | | 380/283 |
| 8,961,306 B2* | 2/2015 | LeMay | ............... | G07F 17/3218 |
| | | | | 463/30 |
| 9,112,681 B2* | 8/2015 | Kotani | ............... | G06F 21/33 |
| 9,824,220 B2* | 11/2017 | Baentsch | ............... | G06F 21/575 |
| 9,934,375 B2* | 4/2018 | Gu | ............... | G06F 21/54 |
| 9,953,166 B2* | 4/2018 | Newell | ............... | G06F 21/575 |
| 2008/0120690 A1* | 5/2008 | Norlander | ............... | G06F 21/57 |
| | | | | 726/1 |

* cited by examiner

APPARATUS AND METHOD FOR A MULTI-ENTITY SECURE SOFTWARE TRANSFER

BACKGROUND

1. Field

The present disclosure relates to software transfer in hardware systems. More particularly, this invention is directed toward a hardware apparatus and a method for multi-hardware entity secure software transfer.

2. Description of Related Technology

A hardware entity may provide means for executing secure software that is software signed and optionally encrypted; therefore, the software is known to not have been compromised. Such a hardware entity may comprise a processor or a co-processor, either mounted on a main board or mounted on an add-in-card and communicating to a main board over an interface. As long as the software is not exposed to an input/output (I/O) interface external to the hardware entity, the software can be considered secure.

However, such a secure software may not be stored at the executing hardware entity, e.g., to save storage, and may need to be transferred to the executing hardware entity from an external hardware entity over a communication link, e.g., from another co-located processor or co-processor, or from the main board. The communication link may be attacked by a malicious hardware entity via, e.g., a man-in-the-middle and/or any other attack, and the security of the software may be compromised.

Consequently, in systems comprising multiple hardware entities having to share a secure software there exists a problem how to transfer the secure software between these hardware entities, and optionally to establish trust between the hardware entities considered trusted to protect the transfer of the secure software from man-in-the-middle and other attacks.

Accordingly, there is a need in the art for an apparatus and a method, providing a solution to the above identified problems, as well as additional advantages.

SUMMARY

In an aspect of the disclosure, an apparatus and a method for a hardware multi-entity secure software transfer according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 1:
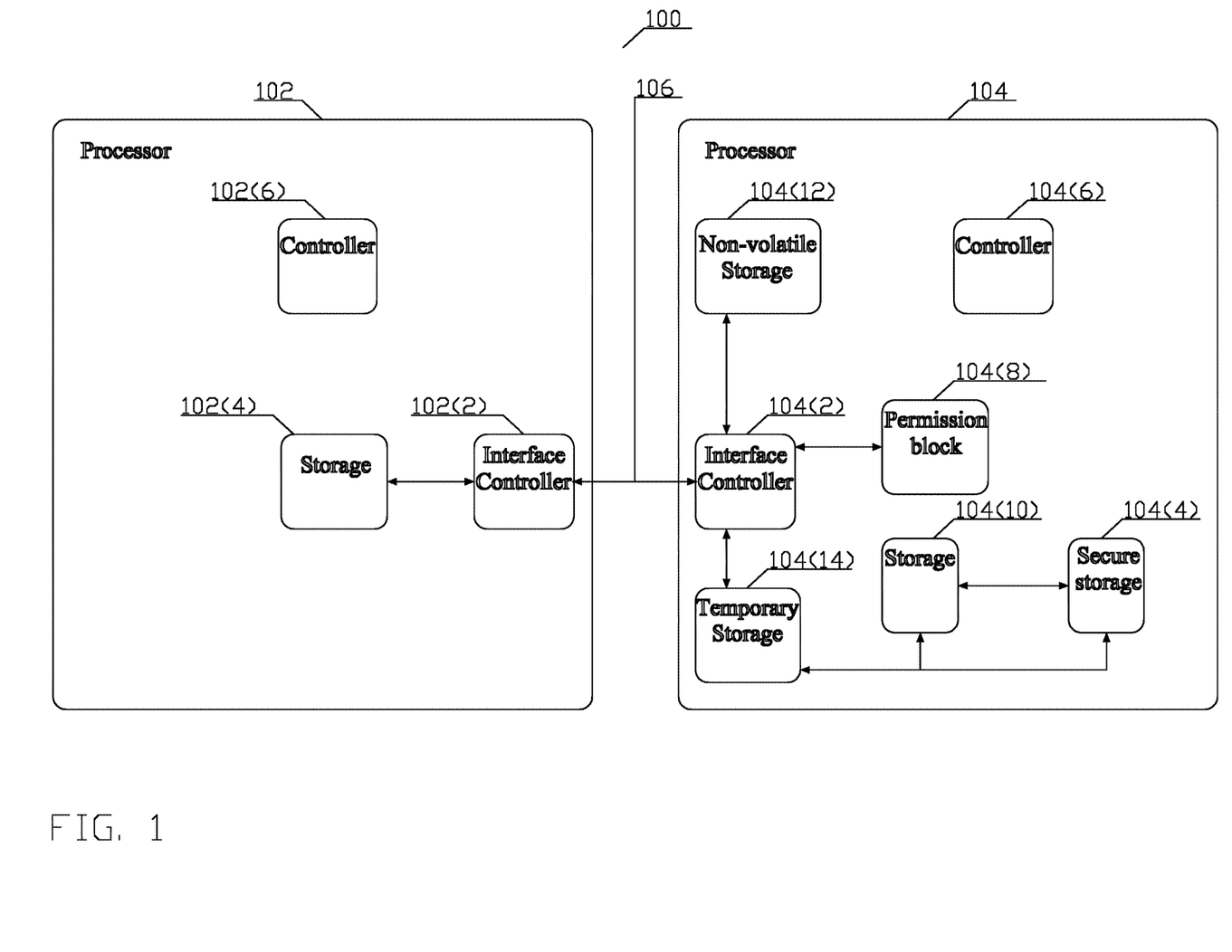
FIG. 1 depicts a conceptual structure of a non-trusted hardware entity transferring secure software over a communication link to a trusted hardware entity in accordance with an aspect of this disclosure.
Figure 2:
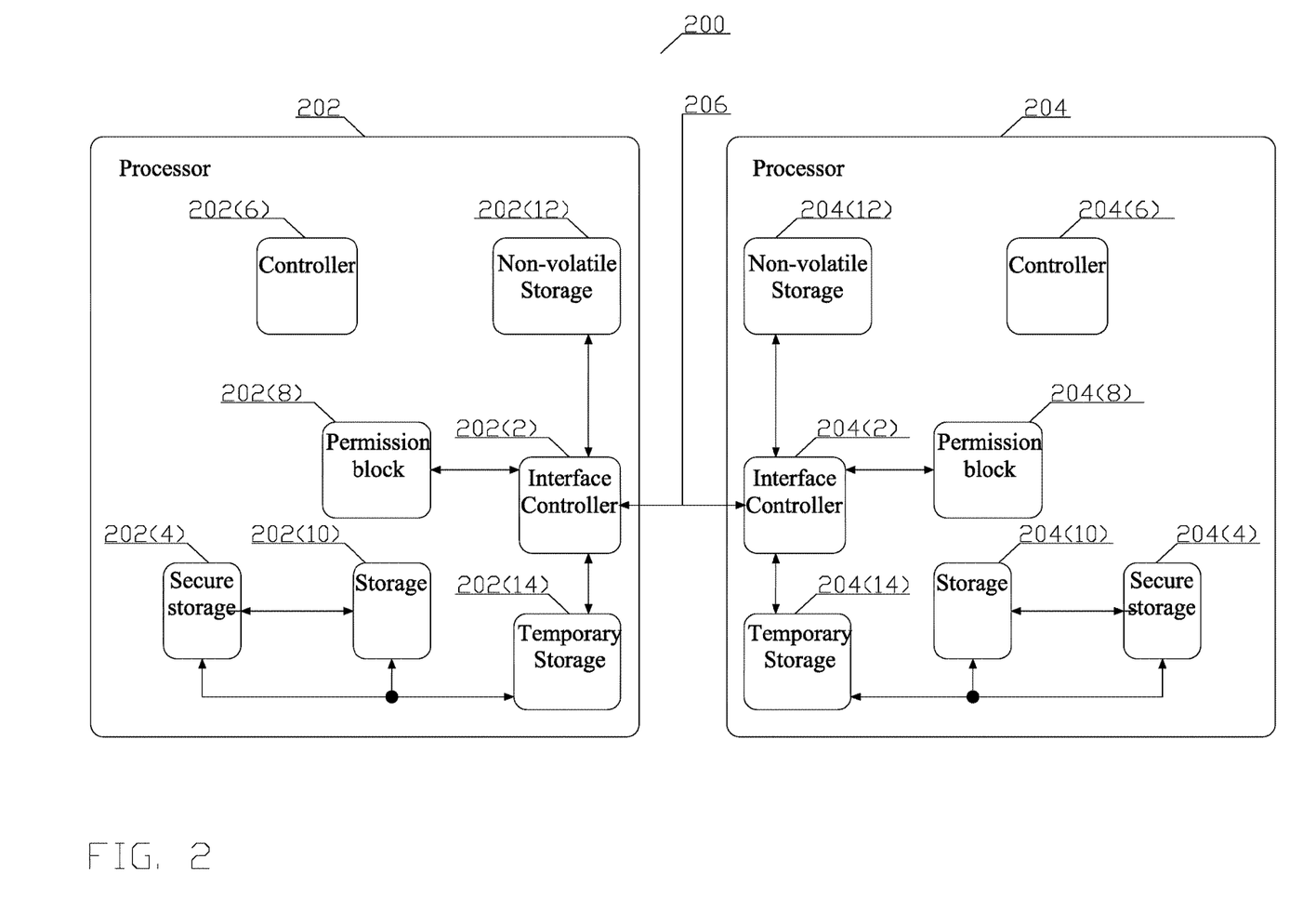
FIG. 2 depicts a conceptual structure of two trusted hardware entities transferring secure software over a communication link in accordance with an aspect of this disclosure.

The description of like structural elements among the figures is not repeated; the like elements have reference numerals differing by an integer multiple of 100, i.e., reference numeral 102 in FIG. 1, becomes reference numeral 202 in FIG. 2; unless differences and/or alternative aspects are explicitly noted. An expression "_X" in a reference indicates an instance of an element; an expression ("X") in a reference indicates a sub-block, in a drawing where such indication is helpful for better understanding. Any unreferenced double-arrow line indicates a possible information flow between the communicatively coupled entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "communicatively coupled" is intended to specify a communication path permitting information exchange either directly among the communicatively coupled entities, or via an intervening entity.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects presented throughout this disclosure will be readily apparent to a person having ordinary skill in the art, and the concepts disclosed herein may be extended to other applications.

FIG. 1 depicts a conceptual structure 100 of a non-trusted hardware entity 102 transferring secure software over a communication link 106 to a trusted hardware entity 104 in accordance with an aspect of this disclosure. The term trusted hardware entity comprises a hardware entity consistently behaving in expected ways, and that behavior being enforced by the hardware entity's hardware and/or software.

Each of the hardware entities 102, 104, is described in terms of a block diagram comprising the hardware entities' principal elements enabling transferring secure software over a communication link in accordance with an aspect of this disclosure. The elements comprise hardware or software entities implementing the blocks and/or the blocks' functionality. Other elements, e.g., power supplies, input/output interfaces and other elements known to a person skilled in the art not necessary for understanding the invention are omitted for simplicity.

The non-trusted hardware entity 102 comprises a host system, e.g., a standard computer including an interface, e.g., Peripheral Component Interconnect Express (PCIe), serial rapid input and output (sRIO), and any other interface known to a person of ordinary skill in the art, to enable communication with a guest hardware entity 104 over a communication link 106. The interface is managed by an interface controller 102(2).

The non-trusted host hardware entity 102 contains a storage 102(4). The storage 102(4) may comprise any physical device used to store instructions and/or data on a temporary or permanent basis. Any type of memory known to a person skilled in the art is contemplated. The storage 102(4) contains a secure software to be transferred to the trusted guest hardware entity 104. In one aspect, the secure software comprises a boot image that is used to boot the trusted guest hardware entity 104. The software in the storage 102(4) may be signed and optionally encrypted. Since the host hardware entity 102 is not trusted, the software is provided to the non-trusted host hardware entity 102 already signed and optionally encrypted.

The software is signed by an asymmetric encryption algorithm, e.g., Digital Signature Algorithm (DSA), Rivest-Shamir-Adelman (RSA), or any other asymmetric encryption algorithm known to a person of ordinary skill in the art, by computing a checksum and encoding the computed checksum using a private key. The signature and a public key are stored in the storage 102(4), and the public key is additionally stored on the trusted guest hardware entity 104 in a non-volatile storage 104(12) to enable the trusted guest hardware entity 104 to verify by authenticating the signature that the secure software has not been compromised. The public key is programmed into the storage 104(12) by the trusted guest hardware entity's 104 manufacturer, or any other authorized party, e.g., an original equipment manufacturer (OEM) using the trusted guest hardware entity 104 in a manufactured device and/or an end user of the device. The security is not compromised by storing the public key in the storage 102(4) because non-trusted hardware entity 102 cannot replace the public key, since a replacement would cause the authentication to fail and the guest hardware entity 104 would know that the secure software has been compromised. The non-volatile storage may comprise, e.g., an Electrically Erasable Programmable Read-Only Memory (EEPROM), electronic fuses, or any other non-volatile storage known to a person of ordinary skill in the art.

The software is optionally encrypted using a symmetric encryption algorithm, e.g., Data Encryption Standard (DES), Advanced Encryption Standard (AES), or any other symmetric encryption algorithm known to a person of ordinary skill in the art, using the algorithm's secret key. To enable decryption, the secret key for the encryption algorithm is stored in the non-volatile storages 104(12) on the trusted guest hardware entity 104. The encryption key is programmed into the storage 104(12) by the trusted guest hardware entity's 104 manufacturer, or any other authorized party, e.g., an original equipment manufacturer (OEM) using the trusted guest hardware entity 104 in a manufactured device and/or an end user of the device.

Because the software is signed and optionally encrypted, the communication link 106 does not need to be secure because the trusted guest hardware entity 104 may verify by authenticating the signature that the secure software has not been compromised.

The interface controller 102(2) receives data for transmission from the communicatively coupled storage 102(4), formats the data according to the protocol used for the communication link 106, and transmits the data over the communication link 106.

The co-operation among the different entities of the non-trusted host hardware entity 102 is coordinated by a controller 102(6) communicatively coupled (not shown) to the entities. The controller 102(6) may be implemented as a software executing on the host hardware entity's 102 processor (not shown).

The trusted guest hardware entity 104 may comprise a processor or a coprocessor, comprising an interface compatible with the interface of the host hardware entity 102. The interface is managed by an interface controller 104(2).

Any data communicated by the non-trusted host hardware entity 102 over the communication link 106 is received by the interface controller 104(2), extracted from the communication link's 106 protocol and temporarily stored in a storage 104(14). The data may comprise control data, e.g., for establishing and configuring the communication link 106, as well as user data. In one aspect the storage 104(14) comprises a register, i.e., a small amount of storage available as part of a Central Processing Unit (CPU) or other processor or co-processor. Such registers are (typically) addressed by mechanisms other than main memory and can be accessed more quickly. Almost all computers, load-store architecture or not, load data from a larger memory into registers where it is used for arithmetic, manipulated, or tested, by some machine instruction. In one aspect, the register may be part of a secure storage 104(4).

The secure storage 104(4) comprises any storage, content of which is not accessible to non-authorized entities. In one aspect, the secure storage is implemented on the same chip as the trusted guest hardware entity 104. In another aspect, the secure storage 104(4) is outside the trusted guest hardware entity 104. Because the secure storage 104(4) eventually stores the authenticated and optionally decrypted software, the communication link between the outside secure storage 104(4) and the guest hardware entity 104 must be secured to prevent the secure software from being compromised by a hardware entity having permission to access the outside secure storage 104(4). Since the content of the outside secure storage 104(4) and the communication link is controlled by a single trusted guest hardware entity 104, any encryption algorithm imposed by the trusted guest hardware entity 104 may be used.

Any data to be communicated from the trusted guest hardware entity 104 to the non-trusted host hardware entity 102 is received and temporarily stored in a storage 104(14) and provided to the interface controller 104(2), which formats the data according to the protocol used for the communication link 106, and transmits the data over the communication link 106. The data is received at the interface controller 102(2), extracted from the communication link's 106 protocol and provided to the communicatively coupled storage 102(4).

To prevent a potential attacker from interfering with secure software transfer, permission block 104(8) determines what access from the non-trusted host hardware entity 102 to any of the entities of the trusted guest hardware entity 104 is permitted.

Storage 104(10) receives user data received from the non-trusted host hardware entity 102 via the temporary storage 104(14). In one aspect, the storage 104(10) comprises a storage physically separate from the storage 104(4). In another aspect, the storage 104(10) may comprise a dedicated and protected area in the storage 104(4). Such a physical or logical separation enables different access permissions to be used for the storages 104(4) and 104(10). Permission for the storage 104(10) allows, while permission for the storage 104(4) prohibits, writing access from the non-trusted host hardware entity 102. Such permissions prevent the non-trusted host hardware entity 102 from modifying the software after the software has been authorized and optionally decrypted by the trusted guest hardware entity 104 as disclosed in detail infra.

The co-operation among the different entities of the trusted guest hardware entity 104 is coordinated by a controller 104(6) communicatively coupled (not shown) to the entities. The controller may be implemented as a software executing on the trusted guest hardware entity 104.

FIG. 2 depicts a conceptual structure 200 of two trusted hardware entities 202, 204, transferring secure software over a communication link 206 in accordance with an aspect of this disclosure. The two trusted hardware entities comprise two processors or co-processors, configured in a master-slave role. The master-slave configuration is accomplished by e.g., pin-strapping, negotiation, and any other process known to a person of ordinary skill in the art. The processors may be identical processors or different processors, as long as each of the processors supports the structures necessary for secure software transfer disclosed herein.

Each of the processors 202, 204, is described in terms of a block diagram comprising the processors' principal elements enabling transferring secure software over a communication link in accordance with an aspect of this disclosure. The elements comprise hardware or software entities implementing the blocks and/or the blocks' functionality. Other elements, e.g., power supplies, input/output interfaces and other elements known to a person skilled in the art not necessary for understanding the invention are omitted for simplicity.

Each of the processors 202, 204 contains secure storage 202(4), 204(4), i.e., any storage content of which is not accessible to non-authorized entities. The secure storage may comprise any physical device used to store instructions and/or data on a temporary or permanent basis. Any type of memory known to a person skilled in the art is contemplated. In one aspect, this is a memory implemented on the same chip as the processor. In another aspect, the secure storage 202(4), 204(4) is outside the processor chip 202, 204.

The master processor, e.g., the processor 202, contains in the storage 202(4) secure software to be provided to the slave processor 204. In one aspect, the secure software comprises a boot image to be transferred to the slave processor 204 and to boot the slave processor 204. The secure software in the storage 202(4) may be signed and optionally encrypted. The software is signed by an asymmetric encryption algorithm, e.g., Digital Signature Algorithm (DSA), Rivest-Shamir-Adelman (RSA), or any other asymmetric encryption algorithm known to a person of ordinary skill in the art, by computing a checksum and encoding the computed checksum using a private key. The signature and a public key are stored in the storage 202(4), and a copy of the public key is stored in a non-volatile storage 204(12) to enable the slave processor 204 to verify by authenticating the signature that the secure software has not been compromised. The public key is programmed into the storages 202(12), 204(12) by the processor's 104, 204 manufacturer, or any other authorized party, e.g., an original equipment manufacturer (OEM) using the processor 104, 204 in a manufactured device and/or an end user of the device. The non-volatile storage may comprise, e.g., an Electrically Erasable Programmable Read-Only Memory (EEPROM), electronic fuses, or any other non-volatile storage known to a person of ordinary skill in the art.

In one aspect, the software is encrypted using a symmetric encryption algorithm, e.g., Data Encryption Standard (DES), Advanced Encryption Standard (AES), or any other symmetric encryption algorithm known to a person of ordinary skill in the art, using the algorithm's secret key. The secret key for the encryption algorithm is stored in a non-volatile storages 202(12), 204(12). The encryption key is programmed into the storages 202(12), 204(12) by the processor's manufacturer, or any other authorized party, e.g., an original equipment manufacturer (OEM) using the processor in a manufactured device, an end user of the device.

Because the software is signed and optionally encrypted, the communication link 206 does not need to be initially secure because the receiving hardware entity may verify that the software has not been compromised. For the same reason, the communication link between the secure storage 202(4) and the master processor chip 202 does not need to be secure, should the secure storage 202(4) be outside the processor chip 202. On the other hand, the secure storage 204(4) eventually stores the authenticated and optionally decrypted software; therefore, the communication link between the secure storage 204(4) and the slave processor 204 must be secured to prevent the secure software to be from being compromised by a hardware entity having permission to access the secure storage 204(4). Since the content of the secure storage 204(4) and the communication link is controlled by a single processor 204, any encryption algorithm imposed by the processor 204 may be used.

Any data to be communicated over the communication link 206 is temporarily stored in storage 202(14), 204(14). The data may comprise control data, e.g., for establishing and configuring the communication link 206, as well as user data. In one aspect the storage comprises a register, i.e., a small amount of storage available as part of a Central Processing Unit (CPU) or other processor or co-processor. In one aspect, the register may be part of the secure storage 202(4), 204(4). Such registers are (typically) addressed by mechanisms other than main memory and can be accessed more quickly. Almost all computers, load-store architecture or not, load data from a larger memory into registers where it is used for arithmetic, manipulated, or tested, by some machine instruction.

In the master-to-slave communication, an interface controller 202(2) receives data for transmission from the storage 202(14), formats the data according to the protocol used for the communication link 206, and transmits the data over the communication link 206. The data are received at an interface controller 204(2), extracted from the communication link's 206 protocol and provided to the storage 204(14). In the slave-to-master communication, the interface controller 204(2) receives data for transmission from the storage 204(14), formats the data according to the protocol used for the communication link 206, and transmits the data over the communication link 206. The data is received at the interface controller 202(2), extracted from the communication link's 206 protocol and provided to the storage 202(14).

To prevent a potential attacker from interfering with secure software transfer, permission block 202(8), 204(8) determines permitted accesses between the master and the slave, as well as what access from entities external to the processors 202, 204, to any of the processors 202, 204 is permitted, by setting permissions for the storages 202(10), 204(10), and the secure storage 202(4), 204(4).

Storage 204(10) receives user data received from the master processor 202 via the temporary storage 204(14) as directed by the permission block 204(8). In one aspect, the storage 204(10) comprises a storage physically separate from the storage 204(4). In another aspect, the storage block 204(10) may comprise a dedicated and protected area in the storage 204(4). Such a physical or logical separation enables a different access permissions to be used for the storage entities 204(4) and 204(10). Permission for the storage 204(10) allows, while permission for the storage 204(4) does not allow writing access from the master processor 202. Such permission prevents the master processor 202 from modifying the software after the software has been authorized and optionally decrypted by the slave processor 204 as disclosed in detail infra.

The co-operation among the different entities is controlled by controllers 202(6), 204(6) communicatively coupled (not shown) to the entities. The controllers may be implemented as a software executing on the processors 202, 204.

Figure 3A:
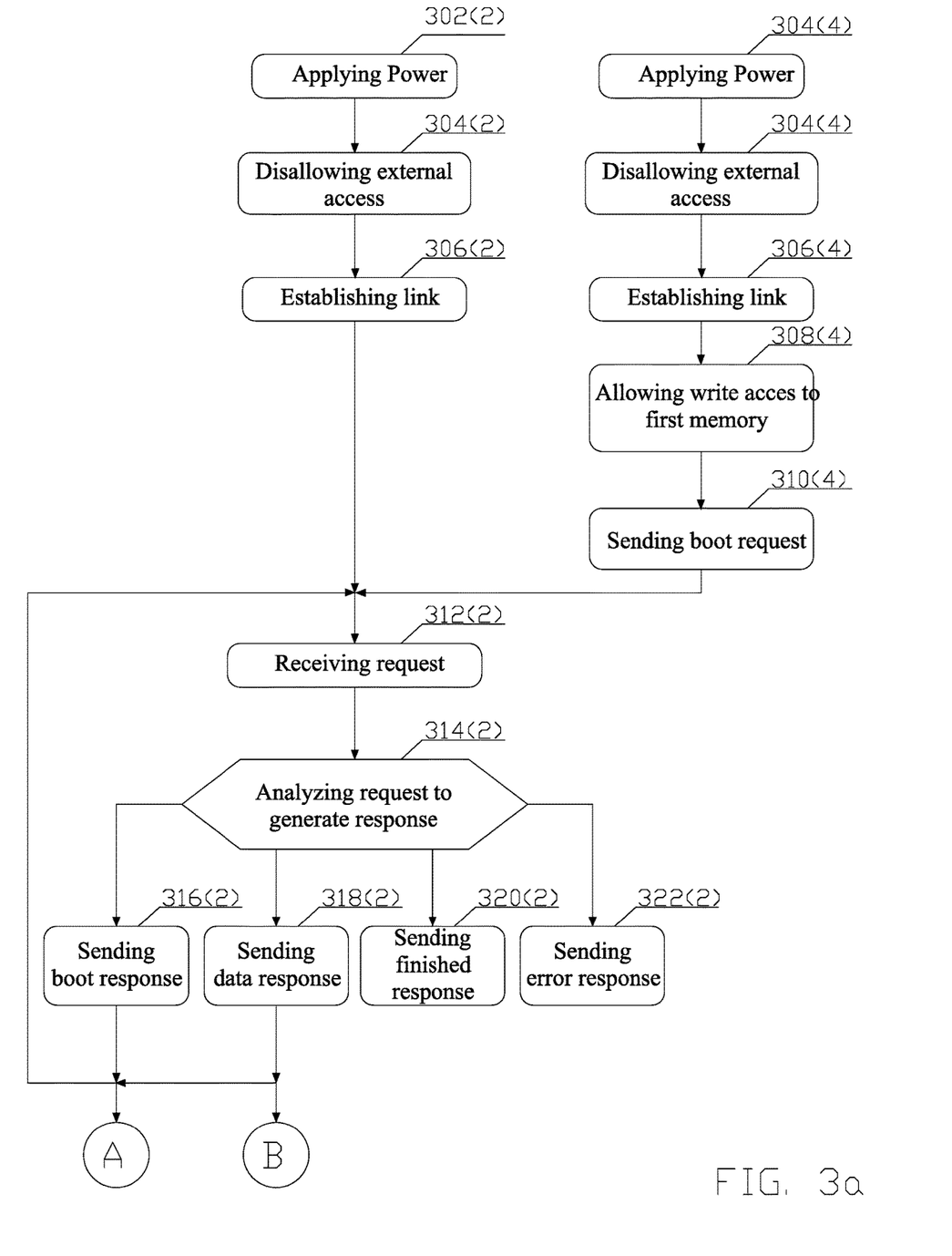
FIG. 3a depicts a first part of a flow chart of a process for transferring secure software from a master hardware entity to a slave hardware entity over a communication link in accordance with an aspect of this disclosure.
Figure 3B:
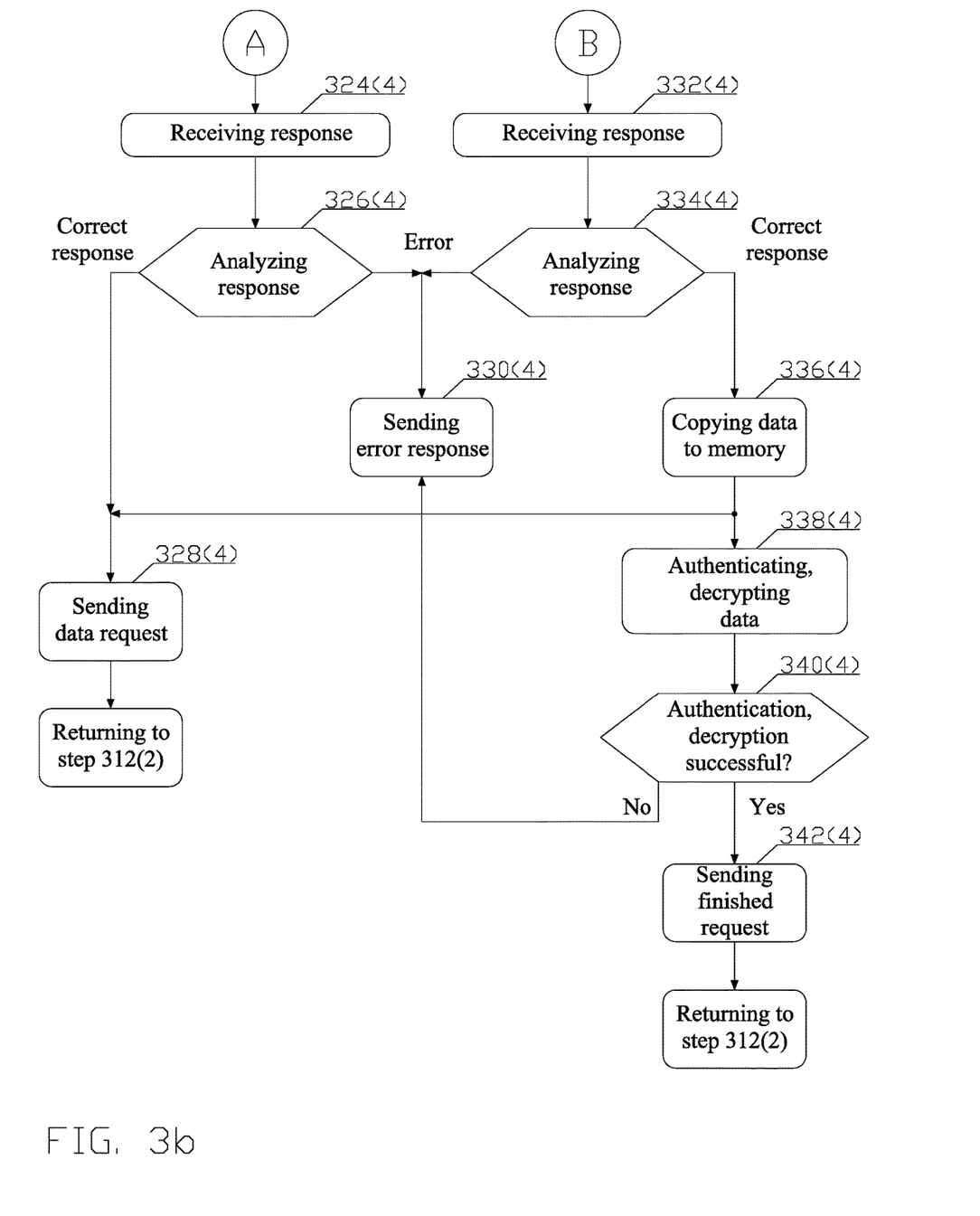
FIG. 3b depicts a second part of the flow chart of a process for transferring secure software from a master hardware entity to a slave hardware entity over a communication link in accordance with an aspect of this disclosure.

FIG. 3 depicts a flow chart of a process for transferring secured software from a first hardware entity to a second hardware entity over a communication link in accordance with an aspect of this disclosure. The differences between the conceptual structure of a non-trusted hardware entity transferring secure software over a communication link to a trusted hardware entity and the conceptual structure of two trusted entities transferring secure software over a communication link, do not substantially affect the process for communicating a secured software. Consequently, to clarify the relationship between the flow chart of FIG. 3 and the elements of the conceptual structure disclosed in greater details in FIG. 1 and associated text and the conceptual structure disclosed in greater details in FIG. 2 and associated text supra, the references to the elements of the conceptual structures, are in parenthesis. To simplify notation, the letter "X" in a reference stands for both the numeral 1 and the numeral 2; therefore, by means of an example, reference X02 refers collectively to the non-trusted host hardware entity 102 and the master processor 202. FIG. 3 discloses the steps to be taken in a sequential order, therein the vertical direction can be considered a time axis for the sequence. Steps that are carried out by the hardware entities (X02, X04) substantially concurrently or the sequence of which does not matter have the same reference, distinguishing by a parenthetical subscript identifying the hardware entity.

In one aspect, at least a boot image is the secret software to be shared. Consequently, this aspect is disclosed in the flow chart.

Referring now to FIG. 3, in step 302, the power is applied to the hardware entities (X02, X04) as a result of a power up or a reset. The process continues in block 304.

In step 304, the controller(s) at each trusted hardware entity (X02(6), X04(6)) cause the permission blocks (X02 (8), X04(8)) to disallow any external access to the hardware entities (X02, X04), except as needed for establishing communication link (X06). Thus, in the case of a non-trusted hardware entity transferring secure software over a communication link to a trusted hardware entity, only the controller (104(6)) carries out this action. On the other hand, in the case of a trusted hardware entity transferring secure software over a communication link to a trusted hardware entity both controllers (202(6)), 204(6)) carry out this action. This action prevents an attacker from sending to the hardware entities (X02, X04) a transaction in an attempt to gain access and compromise the software transfer. The process continues in step 306.

In step 306, the controllers (X02(6), X04(6)) cause the interface controllers (X02(2), X04(2)) to communicate with one another, performing establishment of the communication link (X06) before regular communication over the communication link (X06) begins. Such a communication may comprise, e.g., training, negotiation to set parameters of a communications channel, and other communication known to a person of ordinary skill in the art. The process continues in step 308.

In step 308, the master hardware entity, i.e., the non-trusted host hardware entity (102) or the master processor (202), boots and the slave hardware entity's controller, i.e., the trusted guest hardware entity controller (104(6)) or the slave processor controller (204(6)), cause the respective permission block (X04(8)) to allow write transaction of the data received over the communication link (X06) into the storage X04(14) to only the storage (X04(10)). The process continues in step 310.

In step 310, the slave's controller (X04(6)) writes a boot request command to the storage (X04(14)) and causes the boot request to be communicated via the interface controllers (X04(2), X02(2)) and the communication link (X06) to the master hardware entity (X02). The process continues in step 312.

In step 312, the master hardware entity (X02) receives a request. The process of receiving data at the master hardware entity is disclosed supra and is not repeated for the sake of brevity. The process continues in step 314.

In step 314, the master's controller (X02(6)) decodes the request and analyzes the decoded request to generate a response in accordance with the result of the analysis. When the result of decoding indicates a boot request, the process continues in step 316. When the result of decoding indicates a data request, the process continues in step 318. When the result of decoding indicates acknowledgement of a response to a request command, the process continues in step 320. Otherwise, when the result of decoding indicates an error, e.g., failure to decode, data integrity mismatch, the boot image does not exist, e.g., because the master hardware entity did not receive the boot image, booting over the communication link is not allowed, or any other error, the process continues in step 322.

Since the result of decoding indicates the boot request, the process continues in step 316, in which the master's controller (X02(6)) causes the boot response to be communicated via the interface controller (X02(2)) and the communication link (X06) to the slave hardware entity (X04). The process of transmitting data from the master hardware entity is disclosed supra and is not repeated for the sake of brevity. The master's controller (X02(6)) then awaits another communication form the slave (X04) by returning to step 312. The process continues in step 324.

In step 324, the slave's controller (X04(6)) is notified about a response being received by the storage (X04(14)). In one aspect, the notification may be a message in the storage (X04(14)). In another aspect, the slave's controller (X04(6)) monitors writes into the storage block (X04(14)). The process continues in step 326.

In step 326, the slave's controller (X04(6)) retrieves and decodes the response and analyzes the decoded response to generate a response in accordance with the result of the analysis. When the analysis indicates a correct response to the sent request, e.g., the boot response, the process continues in step 328. Otherwise, when the result of decoding indicates an error, e.g., failure to decode, data integrity mismatch, request rejection, or any other error, the process continues in step 330.

Since the result of decoding indicates a response to the boot request, the process continues in step 328, where the slave's controller (X04(6)) writes a data request command to the storage (X04(14)) and causes the boot response to be communicated via the communication block (X04(2)) and the communication link (X06) to the master hardware entity (X02). In one aspect, the data request includes a block number which is the address of the data to be retrieved. The address of the data to be retrieved may be determined by, e.g., a prior agreement. In another aspect, the address of the data to be retrieved is not provided and the master hardware entity (X02) assumes that the block numbers are ordered e.g., sequentially. The process returns to step 312.

In step 312, the master's controller (X02(6)) processes the request as disclosed supra. Since the result of decoding indicates the data request, the process continues in step 318.

In step 318, the master's controller (X02(6)) writes the requested data, i.e., the boot image, the signature, and the public key to the storage (X02(4)) and causes the requested data to be communicated via the interface controller (X02(2)) and the communication link (X06) to the slave hardware entity (X04). The data from the storage X04(14) is written to the storage (X04(10)) because as disclosed supra, the permission block (X04(8)) is configured to allow write transaction only to the storage (X04(10)). This prevents the master's controller (X02(6)) from compromising the data by reading/writing a different resource in the slave (X04). The master's controller (X02(6)) then awaits another communication from the slave (X04) by returning to step 312. The process continues in step 332.

In step 332, the slave's controller (X04(6)) is notified about the response, i.e., the data being written to the storage (X04(14)). In one aspect, the notification may be a message in the storage (X04(14)). In another aspect, the slave's controller (X04(6)) monitors writes into the storage block (X04(14)). The process continues in step 334.

In step 334, the slave's controller (X04(6)) retrieves and decodes the response and analyzes the decoded response to generate a response in accordance with the result of the analysis. When the analysis indicates that the response is an error, e.g., by a transmission checksum error, or an error retrieving that block from the storage (X04(14)), the process continues in step 330; otherwise, the process continues in step 336.

In step 336, the slave's controller (X04(6)) copies the data from the storage block (X04(14)) to the storage (X04(4)). Because as disclosed supra, the master hardware entity (X02) does not have a permission to access the storage (X04(4)), the slave hardware entity (X04) may authenticate and optionally decrypt the data without the master hardware entity (X02) being able to compromise the authenticated and encrypted data. When there is more data to be received from the master hardware entity (X02) as indicated by the response analysis, the process returns to step 328; otherwise the process continues in step 338.

In step 338, the slave's controller (X04(6)) ascertains that the received public key is identical to or derived from the public key stored in the storage (X04(12)) and then uses the public key to authenticate the signature of the boot image using the asymmetric encryption algorithm. Then, the slave's controller (X04(6)) optionally decrypts the received boot image using the secret key stored in storage (X04(12)). The process continues in step 340.

In step 340, the slave's controller (X04(6)) determines whether authentication and/or the optional decryption was successful, and when the determination is positive, the process continues in step 342; otherwise, the process continues in step 330.

In step 342, the slave's controller (X04(6)) writes a finished request to the storage (X04(14)) and causes the finished response to be communicated via the communication block (X04(2)), the communication link (X06) to the master hardware entity (X02). The process continues in step 312.

In step 312, the master's controller (X04(6)) processes the request, as disclosed supra. Since the result of decoding indicates finish request, the process continues in step 320.

In step 320, master's controller (X02(6)) causes a finished response to be communicated via the communication block (X04(2)), the communication link (X06) to the slave hardware entity (X04). The process of communicating the secured software ends.

After the process for transferring a secured software from a first hardware entity to a second hardware entity concludes, the slave's controller X04(6) has the boot image, and it is known through authentication that the image is authentic. However, the communication link X06 is not secure and is open to exploitation, e.g., by a man-in-the-middle attack. Therefore, in another aspect, the traffic on the communication link X06 may be encrypted by a link key before allowing any external access to the entities X02, X04. A person of ordinary skill in the art will appreciate that although the encryption process disclosed infra may be applied both for the aspect of the trusted master processor 202 communication with the trusted slave processor 204 and for the aspect of the non-trusting host hardware entity 102 to trusting guest hardware entity 104, the latter may not be useful due to possible compromise at the non-trusted host hardware entity 102.

A link key is retrieved from the non-volatile storage 202(12), 204(12), and provided to the interface controllers 202(2), 204(2), which use the link keys to encrypt the traffic over the communication link 206.

Upon encrypting the traffic over the communication link 206, the permission blocks 202(8), 204(8) increase the level of external access to the processors 202, 204. In one aspect, full external access to the processors 202, 204 is allowed; in another aspect limited access to the processors 202, 204 is allowed. By means of an example, the non-volatile storage 202(12), 204(12), e.g., the storage 202(12), may comprise additional key(s) that can only be accessed by a software executing at the respective processor 202, 204, e.g., the processor 202, and not accessed by a software executing at processor 204. Such key(s) may comprise, e.g., an High-Definition Multimedia Interface (HDMI) key, or a Media Access Control Security (MACsec) key.

To encrypt the communication link, each pair of processors 202, 204, needs to have a unique link key. However, providing the link key(s) to a pair of processors 202, 204 would cause undue burden on an Original Equipment Manufacturer (OEM) manufacturing device comprising the processors, because the pairs would have to be tracked. Consequently, in one aspect, upon manufacturing the device, each pair of processors 202, 204 establishes the unique link key by a key-exchange algorithm, e.g., a Diffie Hellman, or any key-exchange algorithm is used to determine the unique link key. The established unique link key is then programmed into the non-volatile storage 202(12), 204(12). However, the implicit requirement of the key-exchange is trust because a man-in-the-middle can perform the key exchange to both sides since there is no way to authenticate the pair of the processor. Consequently, the OEM must be trusted.

In another aspect, the manufacturer of the processors 202, 204 programs an authentication key into the non-volatile storage 202(12), 204(12) in the processors 202, 204. The processors 202, 204 are then assembled into a device by the OEM. Upon first use of the device, processors 202, 204 determine presence of the link key in the non-volatile storage 202(12), 204(12) and when the link key is not present, the authentication key is used to establish trust between the two processors 202, 204, and upon establishing trust a key-exchange algorithm is used to determine the unique link key. The unique link key is then programmed into the non-volatile storage 202(12), 204(12). Thus in this aspect, the OEM does not need to be trusted.

In yet another aspect, the authentication key may be different for a different series of the same processor type.

The various aspects of this disclosure are provided to enable a person having ordinary skill in the art to practice the present invention. Various modifications to these aspects will be readily apparent to persons of ordinary skill in the art, and the concepts disclosed herein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand that the flow chart is not exhaustive because certain steps may be added or be unnecessary and/or may be carried out in parallel based on a particular implementation. Additionally, the sequence of the steps may be re-arranged as long as the re-arrangement does not result in functional difference.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. § 112, unless the element is expressly recited using the phrase "means for" or, in the case of a method claim, the element is recited using the phrase "step for."

What is claimed is:

1. A method for a multi-entity secure software transfer, comprising:
configuring a first communication interface controller at a first hardware entity and a second communication interface controller at a second hardware entity to disallow all external access to the respective first hardware entity and the second hardware entity except a communication link configuration access;
establishing a communication link between the first hardware entity and the second hardware entity subsequent to the configuring;
receiving the secure software at the first hardware entity from the second hardware entity via the communication link;
writing the secure software to a temporary storage at the first hardware entity;
copying the secure software from the temporary storage to a secure storage at the first hardware entity;
retrieving from a non-volatile storage at the first hardware entity a public key; and
authenticating the secure software in the secure storage using the public key.

2. The method as claimed in claim 1, further comprising:
retrieving from the non-volatile storage an encryption key; and
decrypting the secure software in the secure storage using the encryption key.

3. The method as claimed in claim 1, wherein both the first hardware entity and the second hardware entity are trusted hardware entities.

4. The method as claimed in claim 3, further comprising:
programming an authentication key into the non-volatile storage at the first hardware entity and into a non-volatile storage at the second hardware entity by a manufacturer of the hardware entities.

5. The method as claimed in claim 3, further comprising:
determining presence of a link key in the non-volatile storage at the first hardware entity; and
establishing the link key and programming the link key into the non-volatile storage at the first hardware entity when the link key is not present.

6. The method as claimed in claim 5, further comprising:
retrieving from the non-volatile storage at the first hardware entity the link key; and
encrypting the communication over the communication link by the link key.

7. The method as claimed in claim 5, wherein the establishing the link key comprises:
retrieving an authentication key from the non-volatile storage at the first hardware entity;
establishing trust between the first hardware entity and the second hardware entity using the authentication key; and
establishing the link key by a key-exchange algorithm.

8. The method as claimed in claim 3, further comprising:
determining presence of a link key in a non-volatile storage at the second hardware entity; and
establishing the link key and programming the link key into the non-volatile storage at the second hardware entity when the link key is not present.

9. The method as claimed in claim 8, further comprising:
retrieving from the non-volatile storage at the second hardware entity the link key; and
encrypting the communication over the communication link by the link key.

10. The method as claimed in claim 9, further comprising:
configuring the first communication interface controller and the second communication interface controller to increase the level of external access.

11. The method as claimed in claim 8, wherein the establishing the link key comprises:
retrieving an authentication key from the non-volatile storage at the second hardware entity;

establishing trust between the first hardware entity and the second hardware entity using the authentication key; and establishing the link key by a key-exchange algorithm.

12. An apparatus for a multi-entity secure software transfer, comprising:
a first hardware entity, comprising a first communication interface controller, a first hardware entity secure storage comprising the secure software, and a first hardware entity controller communicatively coupled to the first communication interface controller and the first hardware entity secure storage; and
a second hardware entity, comprising a second communication interface controller, a second hardware entity temporary storage, a second hardware entity secure storage, a second hardware entity non-volatile storage, and a second hardware entity controller communicatively coupled to the second communication interface controller and the second hardware entity temporary storage; wherein:
the first hardware entity controller and the second hardware entity controller are configured to cause the respective entity's communication interface controller to: disallow all external access to the respective first hardware entity and the second hardware entity except a communication link configuration access and subsequently establish a communication link;
the first hardware entity controller is configured to cause transmission of the secure software over the communication link; and
the second hardware entity controller is further configured to allow write access from the first hardware entity to only the second hardware entity temporary storage, to write to the second hardware entity temporary storage the secure software received over the communication link from the first hardware entity, to copy the secure software from the second hardware entity temporary storage to the second hardware entity secure storage, to retrieve from the second hardware entity non-volatile storage a public key, and to authenticate the secure software in the second hardware entity secure storage using the public key.

13. The apparatus as claimed in claim 12, wherein the second hardware entity controller is further configured to:
retrieve from the second hardware entity non-volatile storage an encryption key; and
decrypt the secure software in the second hardware entity secure storage using the encryption key.

14. The apparatus as claimed in claim 12, wherein both the first hardware entity and the second hardware entity are trusted hardware entities.

15. The apparatus as claimed in claim 14, wherein the first hardware entity further comprises:
a first hardware entity non-volatile storage;
wherein an authentication key is programmed into the first hardware entity non-volatile storage and the second hardware entity non-volatile storage by a manufacturer of the hardware entities.

16. The apparatus as claimed in claim 14, wherein the first hardware entity controller is further configured to:
determine presence of a link key in a first hardware entity non-volatile storage;
establish the link key; and
program the link key into the first hardware entity non-volatile storage when the link key is not present.

17. The apparatus as claimed in claim 16, wherein the first hardware entity controller is further configured to:
retrieve from the first hardware entity non-volatile storage the link key;
encrypt the communication over the communication link by the link key; and
configure the first communication interface controller to increase the level of external access.

18. The apparatus as claimed in claim 16, wherein the link key is established by the first hardware entity controller, wherein the first hardware entity controller is further configured to:
retrieve an authentication key from the first hardware entity non-volatile storage;
establish trust between the first hardware entity and the second hardware entity using the authentication key; and
establish the link key by a key-exchange algorithm.

19. The apparatus as claimed in claim 14, wherein the second hardware entity controller is further configured to:
determine presence of a link key in the second hardware entity non-volatile storage;
establish the link key; and
program the link key into the second hardware entity non-volatile storage when the link key is not present.

20. The apparatus as claimed in claim 19, wherein the second hardware entity controller is further configured to:
retrieve from the second hardware entity non-volatile storage the link key;
encrypt the communication over the communication link by the link key; and
configure the second communication interface controller to increase the level of external access.

21. The apparatus as claimed in claim 19, wherein the link key is established by the second hardware entity controller, wherein the second hardware entity controller is further configured to:
retrieve an authentication key from the second hardware entity non-volatile storage;
establish trust between the first hardware entity and the second hardware entity using the authentication key; and
establish the link key by a key-exchange algorithm.

* * * * *